United States Patent [19]

Satterfield

[11] 3,786,183

[45] Jan. 15, 1974

[54] CONTRAST DETECTOR FOR VIDEO TRACKING SYSTEM

[75] Inventor: Richard Alan Satterfield, Huntington Beach, Calif.

[73] Assignee: Northrup Corporation, Los Angeles, Calif.

[22] Filed: June 21, 1972

[21] Appl. No.: 264,975

[52] U.S. Cl. .......................... 178/6.8, 178/DIG. 21

[51] Int. Cl. .......................................... H04n 7/18

[58] Field of Search ...................... 178/6.8, DIG. 21

[56] References Cited

UNITED STATES PATENTS 3,257,505 6/1966 Wechel ...................... 178/DIG. 21

*Primary Examiner*—Howard W. Britton

*Attorney*—Edward A. Sokolski et al.

[57] ABSTRACT

The video output of a television camera which is being utilized to acquire and track a target is fed through an appropriate clamp and filter to positive and negative peak detectors, which detect the maximum and minimum values of this video appearing within an area defined by a tracking gate or "window." The time constants of the peak detectors are adjusted in accordance with the expected area of the target to provide an optimum signal to noise ratio. Peak positive and negative excursions of the video are held in hold circuits, the time constants of these circuits being governed by an appropriate control signal which provides different time constants for the acquisition mode and for the tracking mode. The outputs of the hold circuits are subtracted from each other, the difference signal thus obtained indicating the spread between the peak positive and negative excursions of the sampled video. This difference signal is multiplied by separate predetermined factors to provide separate signals, each of which is a different fraction of the spread signal. These signals are each separately algebraically summed with the signal representing the peak positive excursion and the signal representing the peak positive excursion and fed to separate voltage comparators for comparison with the clamped and filtered camera output. The output signals thus generated, which represent the width of the video signal at the various amplitudes represented by the multiplying factors, are fed to tracking logical control for utilization in controlling the slewing of the TV camera.

10 Claims, 3 Drawing Figures

CONTRAST DETECTOR FOR VIDEO TRACKING SYSTEM

This invention relates to a contrast detector, and more particularly to such a detector for utilization in controlling the operation of a video tracking circuit which employs television signals.

Certain systems for acquiring and tracking targets utilize a television camera for providing a visual picture of the target for initial acquisition by the operator, and then utilize the video signal generated by the camera for target tracking. Systems of this type are described in U.S. Pat. No. 3,257,505 and an article appearing on Pages 1189–1192 of the Dec. 1967 edition of the Journal of the SMPTE. In the implementations of this type of device, generally, a tracking window gate is used to frame the selected target, control circuitry then being utilized to maintain the selected target within the gate by providing appropriate signals for controlling the slewing of the television camera in response to any error signals indicative of the incipient movement of the target outside of the window gate. In such systems there may be several modes of operation which the operator may select for acquiring a target. One such mode, sometimes referred to as the "automatic acquisition" mode, utilizes a window which is much larger than the target during the initial acquisition of the target. Once the target has been detected (by the system), the window parameters are updated (by the system) so that the window shrinks down on the target and normal tracking ensues.

A particular problem inherent in the handling of video signals of the type generated by a television camera is the necessity for properly discriminating between signals which may be predominantly "white" against a "dark" background as viewed on the TV raster, and vice versa. It is further necessary to properly identify the target from its surroundings and to maintain lock-on on the proper target once it has been initially selected. An additional problem inherent in the handling of video signals of the type generated by a television camera is the necessity of maintaining a good signal to noise ratio for the various modes of system operation. This is particularly important for the automatic acquisition mode (hereafter referred to simply as "acquisition") where the size of the window may be much greater than the size of the target.

The device of this invention provides an improvement over prior art systems of the type described in providing an improved contrast detector device which adapts to the characteristics of the incoming signals and provides information as to the characteristics of such signals which can be used in logical control circuitry for optimizing the operation of the system. The device of this invention achieves such improved operation by providing means for detecting the peak positive and negative excursions of the video signals which appear within the window gate and then generating signals indicative of the widths of such video signals at various amplitude levels thereof, thus providing more accurate information as to the characteristics of these signals. Also, means are provided to adapt the time constants of the peak detectors utilized to provide immunity to noise signals and other extraneous undesired signals, thus affording an optimum signal to noise ratio. A clamp-filter is utilized in the device of the invention which automatically adapts to the mode of operation to provide soft clamping (during active TV scanning) which filters out low frequency components during the acquisition of a target and provides hard clamping (during blanking) to provide DC restoration once the target has been acquired. Additionally, time constant control is provided to optimize operation during the acquisition and tracking modes.

It is therefore an object of this invention to improve the ability of a television video tracking system to acquire and track targets.

It is another object of this invention to provide an improved contrast detector circuit for use in a video tracking system in which time constant response is automatically adapted to provide optimum operation for different modes of operation.

Other objects of this invention will become apparent as the description proceeds in connection with the accompanying drawings, of which:

Briefly described, the device of the invention is as follows: Signals from a TV camera are appropriately clamped and filtered in an adaptive circuit which provides soft clamping (during active TV scanning) during target acquisition and hard clamping (during blanking) during tracking to provide optimum filtering and clamping action. The clamped video is fed to both positive and negative peak detectors, these detectors being gated in response to a window signal corresponding to the window utilized in the TV camera for framing a target of interest. The time constant response of the peak detectors is automatically adjusted in accordance with the expected area of the target as determined in logical control circuitry. The peak detected positive and negative signals are each held in separate hold circuits while a successive up-dated peak voltage measurement is being made by the detectors. The spread between the peak positive and peak negative signals is determined in a differencing circuit, this difference or "spread" signal being limited to a predetermined maximum value. The spread signal is then separately multiplied by two predetermined constants providing two output signals which represent predetermined different fractions thereof. These multiplied signals are then each algebraically summed with the peak positive and negative excursions respectively. These outputs are each then compared in comparators with the clamped video signal output of the TV camera, outputs from each comparator being generated whenever the amplitude of the clamped video exceeds that of the summed input signals fed thereto. The outputs of the comparators, which are pulses having a width and time of occurrence indicating the characteristics of the camera's video output, are fed to a tracking logical control for utilization in controlling the slewing of the camera to maintain proper target lock-on.

Figure 1:
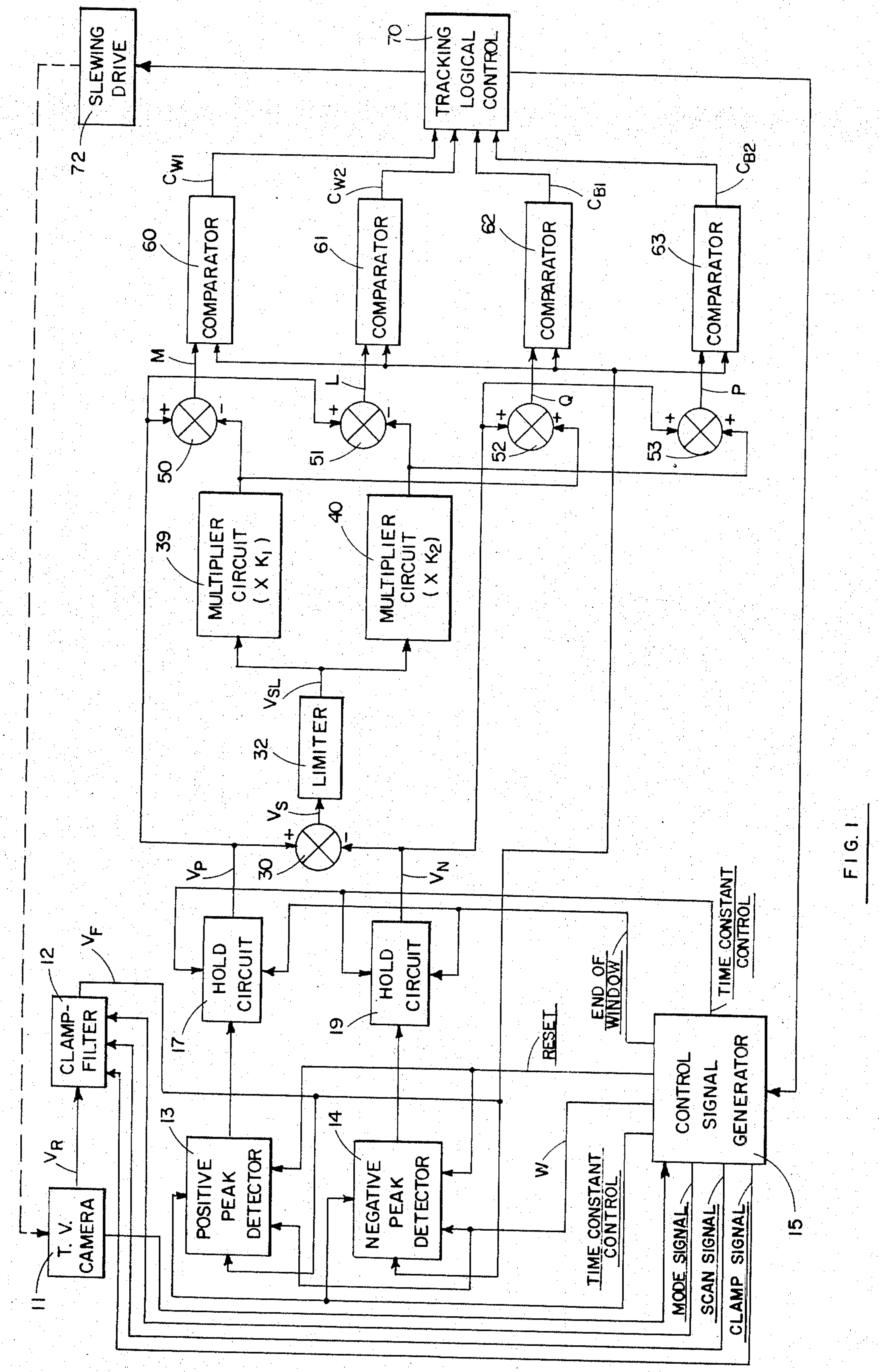
FIG. 1 is a functional block diagram of a preferred embodiment of the invention.

Referring now to FIG. 1, a preferred embodiment of the invention is illustrated. The output, $V_R$, of TV camera 11 is fed to clamp-filter 12 which clamps the signal, as to be explained in connection with FIG. 3, in accordance with the mode of operation, soft clamping (during active TV scanning) being provided to afford optimum filtering during target acquisition, and hard clamping (during the video blanking periods of the camera) once the target has been acquired. A matched filter is additionally provided to optimize the signal to noise ratio for small targets, the precise characteristics of this filter depending upon the characteristics of the TV camera and the target size to which the system is to be optimized. The output, $V_F$, of clamp-filter 12 is fed to positive peak detector 13 and negative peak detector 14.

Figure 2:
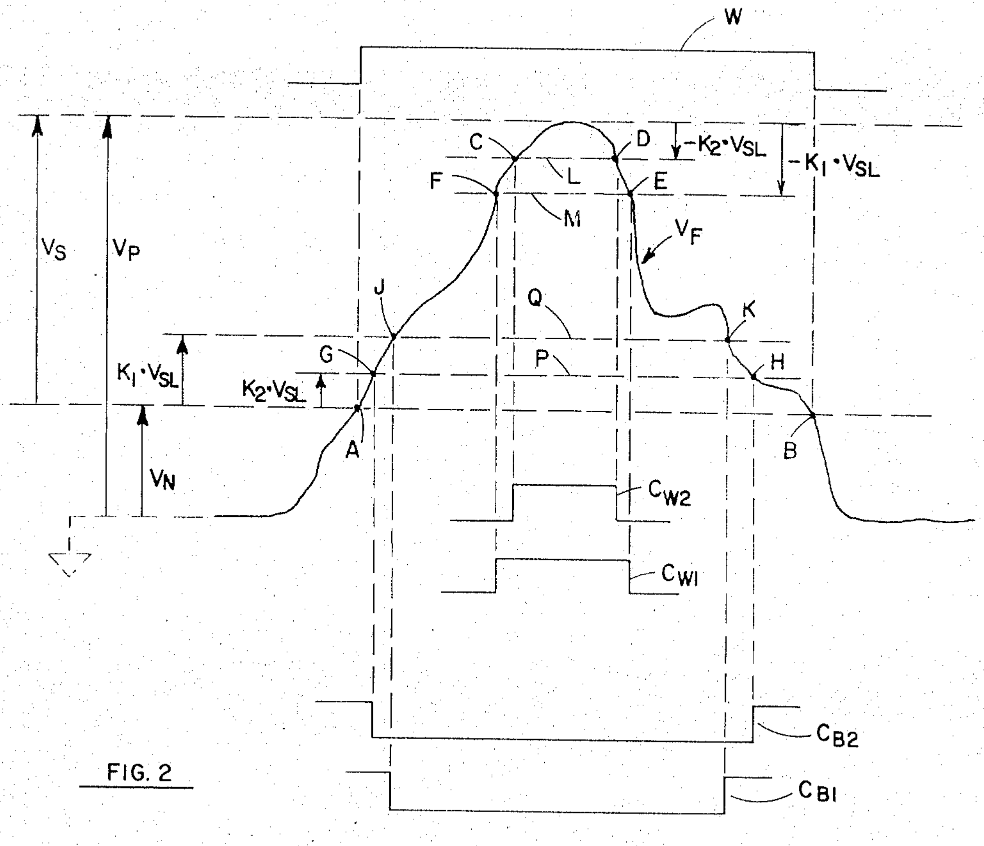
FIG. 2 is a series of wave forms illustrating the operation of the preferred embodiment.

Referring now additionally to FIG. 2, a typical wave shape for the clamped and filtered video, $V_F$, is illustrated. Both positive peak detector 13 and negative peak detector 14 are gated in response to window signal, W, as shown in FIG. 2. These detectors thus only operate to sample video inputs when the window gate, W, is present. Positive peak detector 13 thus provides an output signal representing the maximum or peak positive going excursion of the video which lies within window, W, while negative peak detector 14 has an output representing the minimum or peak negative going excursion of the video lying within the window. It is to be noted that this negative peak can be and often is a signal which is positive with respect to ground, the negative peak detector being operated with appropriate biasing signals to enable "negative" detection under such circumstances. A typical peak detector circuit which may be utilized for the positive and negative peak detectors is described in my pending application Ser. No. 253,158, filed May 15, 1972 for Peak Voltage Detector Circuit.

Peak detectors 13 and 14 are reset (i.e., initialized) once per TV field prior to the first sampling interval in each field by means of a reset signal provided from control signal generator 15. The peak detectors also receive a time constant control signal from the control signal generator which provides an optimum time constant for these detectors which is in accordance with the expected target area. In this manner the peak detectors discriminate against contrast features within the tracking window that are small in area compared to the expected area of the target, such as noise, interior details of the target, etc., so as to avoid such extraneous signals significantly affecting the outputs of the detectors. The outputs of positive and negative peak detectors 13 and 14 are fed to hold circuits 17 and 19 respectively. Hold circuits 17 and 19 sample the outputs of their associated peak detectors once for each TV field. This sampling action is controlled by means of an end-of-window signal provided from control signal generator 15, this signal being generated at the end of each window gate. Hold circuits 17 and 19 thus hold the value of the positive and negative excursions of the video signals, $V_F$, from previous TV fields, while the peak detectors are computing the positive and negative excursions for a current field.

The time constant response of hold circuits 17 and 19 is controlled by means of a time constant control signal from control signal generator 15 which adjusts these time constants so that during a target acquisition mode the time constant is small (typically, several TV fields), while during the track mode, the time constant is long (typically, a fair number of TV fields). This adaptive feature of the hold circuits 17 and 19 provides a system with the capability of quickly adapting to scene conditions when a target is first being scanned, and yet retaining the noise immunity afforded by a long time constant once tracking has been established.

The output signals, $V_P$ and $V_N$, of hold circuits 17 and 19 respectively, which are illustrated in FIG. 2 with reference to ground for illustrative purposes, are fed to differencing circuit 30, the output, $V_S$, thereof being the difference between these two signals. The signal $V_S$ represents the "spread" between the sampled maximum positive going and maximum negative going excursions of the video. The signal $V_S$ is passed through limiter 32 which limits the signal to a predetermined maximum. The output of limiter 32, $V_{SL}$, thus is equal to $V_S$ where $V_S$ is equal to or less than the maximum imposed by limiter 32, and is equal to the maximum value imposed by limiter 32 where $V_S$ is greater than $V_{SL}$. The value set for the limiting imposed by limiter 32 depends upon the noise level of the video signal. When the signal to noise ratio is high enough to permit reliable detection, typically the maximum signal permitted through limiter 32 will be about 20% of the largest video signal expected.

The output, $VS_L$, of limiter 32 is fed to multiplier circuits 39 and 40. Multiplier circuits 39 and 40 multiply the signal by factors "$K_1$" and "$K_2$" respectively, these factors being predetermined fractions. The output of multiplier circuit 39 is fed as a negative input to summing device 50 and as a positive input to summing device 52, while the output of multiplier circuit 40 is fed as a negative input to summing device 41 and as a positive input to summing device 53. Summing devices 50 and 51 receive the positive peak signal, $V_P$, as inputs thereto in positive polarity, while summing devices 52 and 53 receive the peak negative excursion signal, $V_N$, as inputs thereto in positive polarity. The outputs of summing devices 50–53 are at voltage levels indicated by dotted lines M, L, Q, and P, respectively, as shown in FIG. 2. These values represent the difference or the sum, as the case may be, of the inputs fed to the various summing devices.

The outputs of summing devices 50–53 are fed to voltage comparators 60–63 respectively, where they are compared in each instance with the video output signal, $V_F$, of clampfilter 12. Each associated pair of summing devices 50–53 and comparators 60–63 form threshold detectors such that when the video voltage, $V_F$, applied to each comparator reaches the "threshold" value established by the signal fed thereto from its associated summing device, a TRUE output will be generated. These various outputs are shown in FIG. 2 as $C_{W2}$, $C_{W1}$, $C_{B2}$, $C_{B1}$. As can be seen, signal $C_{W2}$ has leading and trailing edges which correspond to the points "C" and "D" of video signal $V_F$, which points indicate the points where the video signal goes above and below the threshold established for comparator 61. Similarly, points "F" and "E" indicate the threshold values established for comparator 60 in the generation of signal $C_{W1}$, points "G" and "H" indicate the threshold values for comparator 63 for generating signal $C_{B2}$, and points "J" and "K" indicate the thresholds for comparator 62 resulting in the generation of the signal $C_{B1}$. The limits of the video signal of interest established by window gate W are indicated at points "A" and "B."

It should be immediately apparent that the width and position as well as the fact of the presence or absence of the signals $C_{W1}$, $C_{W2}$, $C_{B1}$ and $C_{B2}$ define the characteristics of the video signal $V_F$, which information can be utilized in logical control circuitry for determining various parameters for optimum target tracking. The outputs $C_{W1}$ and $C_{W2}$ of comparators 60 and 61 are the logic analogs of the proposition that the video signal $V_F$ goes to a more positive value than the adaptive threshold signals utilized, while the outputs $C_{B1}$ and $C_{B2}$ of comparators 62 and 63 respectively are the logic analogs of the proposition that the video signal $V_F$ is more negative than the associated adaptive threshold signal. The outputs of comparators 60–63 are fed to tracking logical control 70 for utilization in logically determining the various control functions for optimum operation. The output of tracking logical control thus is utilized to provide control signals for control signal generator 15 and for driving slewing drive 72 which slews TV camera 11.

Figure 3:
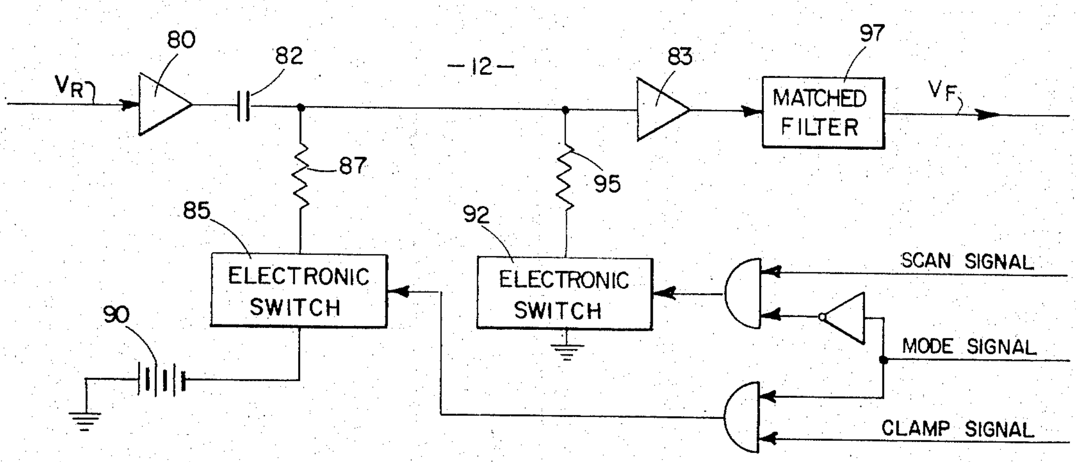
FIG. 3 is a schematic illustration of a clamp-filter circuit which may be utilized in the preferred embodiment.

Referring now to FIG. 3, the clamp-filter circuit of the preferred embodiment of the invention is schematically illustrated. The video output, $V_R$, of the TV camera is fed to buffer amplifier 80 and from this amplifier through capacitor 82 to isolation amplifier 83. During the acquisition of a target a "mode" signal, fed from control signal generator 15, deactivates electronic switch 85 (by inhibiting the "clamp" signal fed from control signal generator 15) and activates electronic switch 92 (by enabling the "scan" signal fed from control signal generator 15). The scan signal operates to activate electronic switch 92 during the active part of each horizontal TV scan. This connects resistor 95 to a ground reference and leaves one end of resistor 87 in a "floating" condition thereby forming a gated high pass filter whose time constant is determined by capacitor 82 and resistor 95. Once the target has been acquired (i.e., the system has locked on to the target) the mode signal, fed from control signal generator 15, deactivates electronic switch 92 (by inhibiting the scan signal fed from control signal generator 15) and activates electronic switch 85 (by enabling the clamp signal fed from control signal generator 15). The clamp signal operates to activate electronic switch 85 during the horizontal blanking interval of each TV scan line. This connects resistor 87 to the negative terminal of a power source 90 and leaves one end of resistor 95 in a floating condition, thereby forming a conventional clamp circuit whose time constant is determined by capacitor 82 and resistor 87. The time constant established by capacitor 82 and resistor 87 is relatively short so that the negative voltage applied through resistor 87 to capacitor 82 effectively discharges any residual charge on the capacitor and provides hard clamping to a predetermined reference voltage. The time constant established by capacitor 82 and resistor 95 is relatively long so as to provide soft clamping action during active TV scanning. Typically, the R-C time constant provided by capacitor 82 and resistor 95 is five times the width of the smallest target of interest. Thus, during active scanning, capacitor 82 and resistor 95 form a high pass filter which attenuates the low frequency components of the video signal and optimizes the signal to noise ratio for small targets within a large window. Thus, two types of clamping action are automatically provided by the clamp circuit to afford optimum operation. A matched filter 97 is connected to receive the output of amplifier 93. This filter operates to further optimize the signal to noise ratio for small targets.

The device of this invention thus provides means for optimizing the operation of a video tracking system by controlling the time constants of the various circuits in response to logical control signals to provide an optimum signal to noise ratio. In addition, information is generated as to the characteristics of the video signal of interest so that the operation of the tracking system can be logically adjusted in accordance with these measured signal characteristics.

While this invention has been descrived and illustrated in detail, it is to be clearly understood that this is intended by way of illustration and example only and is not to be taken by way of limitation, the spirit and scope of this invention being limited only by the terms of the following claims.

I claim:

1. In a contrast detector for a video tracking system, said system including a TV camera for providing a video signal representing a target to be tracked and means for providing a window for framing said video signal, means for generating a signal in accordance with the peak positive going amplitude of the video signal framed by said window, means for generating a signal in accordance with the peak negative going amplitude of the video signal framed by said window, differencing circuit means for generating a signal in accordance with the spread between said signals in accordance with peak positive and negative going amplitudes, means for separately multiplying said spread signal by first and second predetermined factors, means for algebraically separately summing each of said multiplied signals with the signals in accordance with the peak positive and negative going amplitudes to provide threshold signals, and comparator means for comparing the amplitude of the video signals framed by said window with each of said threshold signals and generating output pulses having widths and times of occurrence corresponding to the periods during which the amplitudes of said video signals exceed that of the associated threshold signals, said output pulses representing logic analogs defining the characteristics of the video signal for use in controlling the tracking operation of said system.

2. The contrast detector of claim 1 and further including means for automatically hard clamping said video signal during the blanking periods of said camera and soft clamping said video signal during target tracking.

3. The contrast detector of claim 1 wherein said first and second predetermined multiplying factors are fractional.

4. The contrast detector of claim 1 and further including means for limiting the amplitude of said spread signal to a predetermined maximum value.

5. The contrast detector of claim 1 wherein said means for generating signals in accordance with peak positive and negative going video signal amplitudes comprise positive and negative peak detectors for detecting the peak values of the current field of the camera signal and hold circuits for each of said detectors for holding the peak values of previous fields while a current field is being scanned by the camera.

6. The contrast detector of claim 5 and further including means for automatically adjusting the time constant response of said peak detectors in accordance with the expected area of said target.

7. A method for generating pulse signals indicative of the characteristics of a video output signal of a TV camera representing a target comprising the steps of:

generating a signal in accordance with the peak positive going excursion of said video output signal, generating a signal in accordance with the peak negative going excursion of said video output signal, generating a signal in accordance with the spread between said peak positive and negative going excursions, multiplying said spread signal by a first predetermined factor, multiplying said spread signal by a second predetermined factor, separately algebraically summing each of said multiplied signals with the signals in accordance with the peak positive and negative going excursions to derive threshold signals, and comparing each of said threshold signals with the video output signal to generate a separate one of said pulse signals for each, the width and time of occurrence of said pulse signals being defined by the periods during which said video output signal is above each compared threshold signal.

8. The method of claim 7 and additionally including the step of limiting the amplitude of said spread signal to a predetermined maximum value.

9. The method of claim 7 wherein said predetermined factors have different fractional values.

10. The method of claim 7 and additionally including the step of generating a window signal for framing the target, the video output signal comprising the output of said camera framed by said window signal.

* * * * *